(No Model.)
H. WARMINGTON & B. BULGER.
RUNNING GEAR FOR VEHICLES.
No. 376,219. Patented Jan. 10, 1888.
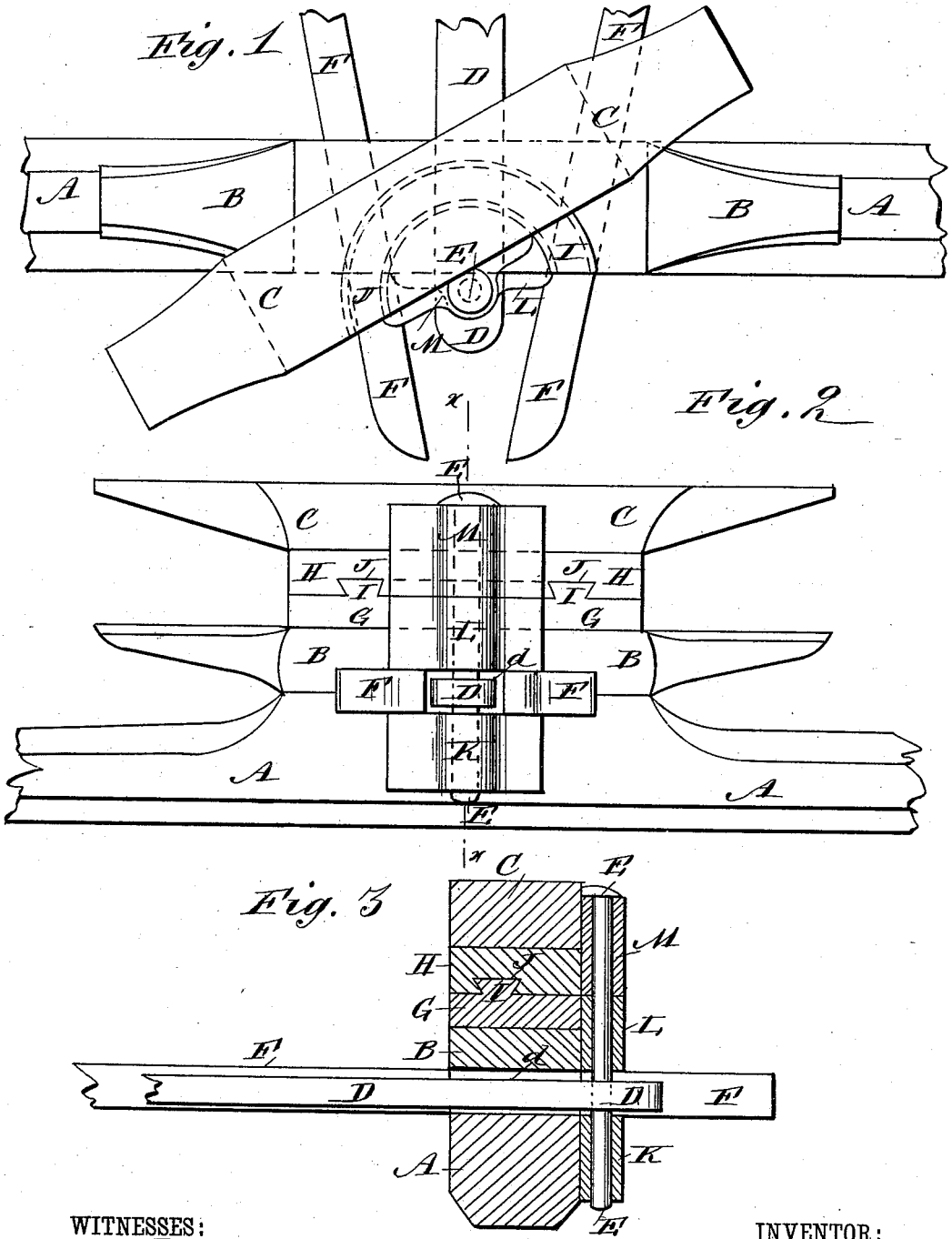
WITNESSES:
C. Neveux
C. Sedgwick
INVENTOR:
H. Warmington
B. Bulger
BY Munn & Co.
ATTORNEYS.

United States Patent Office.

HENRY WARMINGTON AND BENJAMIN BULGER, OF VIRGINIA CITY, MONTANA TERRITORY.

RUNNING-GEAR FOR VEHICLES.

SPECIFICATION forming part of Letters Patent No. 376,219, dated January 10, 1888.

Application filed May 5, 1887. Serial No. 237,212. (No model.)

*To all whom it may concern:*

Be it known that we, HENRY WARMINGTON and BENJAMIN BULGER, both of Virginia City, in the county of Madison and Territory of Montana, have invented a new and Improved Front Running-Gear for Vehicles, of which the following is a full, clear, and exact description.

Our invention relates to front running-gear for vehicles, and has for its object to provide a simple, inexpensive, and substantial running-gear adapted for both heavy and light vehicles.

The invention consists in certain novel features of construction and combinations of parts of the running-gear, all as hereinafter described and claimed.

Reference is to be had to the accompanying drawings, forming a part of this specification, in which similar letters of reference indicate corresponding parts in all the figures.

Figure 1 is a plan view of our improved front running-gear. Fig. 2 is a front view thereof; and Fig. 3 is a sectional side elevation, taken on the line $x\ x$ of Fig. 2.

The forward axle, A, of the running-gear may have any approved construction, and has fixed to it the sand-board B, over which the head-block C is arranged. The reach D passes forward through a recess, $d$, made for it in or at opposing faces of the axle and sand-board, and is connected pivotally to a pin, E, which forms a king-bolt to the running-gear, as hereinafter more fully explained. The side bars, F F, of the forward hounds are fixed to and between the axle and sand-board, and project rearward to connect with the rear cross-bar of the hounds, which have the general form and functions common to forward hounds of ordinary vehicles.

To opposing faces of the sand-board and head-block B C metal plates G H, respectively, are fixed, and in one of these plates, preferably the lower or sand-board plate, G, a projecting dovetailed tongue, I, is formed on a curve struck from the center of the king-bolt, and the opposing or bolster-plate H is formed with a curved dovetailed recess, J, into which the tongue I fits snugly, but so as to allow the head-block, with its plate J, to turn freely either way as the vehicle is turned to one side or the other.

Lugs K L M are fixed to the axle A, the sand-board B, and the head-block G, respectively, and through these lugs and the reach D the king-bolt E passes, as clearly shown in the drawings. The lug L may be formed in one piece with the sand-board plate G, or may be made separately and be fixed to the sand-board, and the lug M may be made in one piece with the head-block plate H, or may be made separately and be fixed to the head-block in any approved way.

It is obvious that the tongues and grooves I J of the sand-board and head-block plates and the king-bolt E mutually re-enforce each other, whether the vehicle be running straight ahead or while being turned on the king-bolt; hence there is little danger of breaking the king-bolt, and should it break by long use the tongues and grooves I J will still prevent disconnection of the head-block and sand-board, and will hold the vehicle body in place until a new king-bolt is applied.

The substantial construction of our tongued and grooved sand-board and head-block plates and king-bolt connections makes them specially desirable for use with the running-gear of wagons intended for drawing heavy loads; and for spring-wagons the tongued and grooved plates and king-bolt would obviate the necessity of a fifth-wheel extending back of the head-block and axle, and thereby effect a considerable saving in the first cost of this class of vehicles, and to whatever style of vehicles the tongued and grooved plates and king-bolt and lugs are applied, the axle, sand-board, and head-block are not pierced and weakened by the king-bolt.

The plates G H, having tongue-and-groove joint I J and lugs L M, and connected by a pivot-bolt passed through the lugs, may be used to connect singletrees to doubletrees of spring or other wagons; but when the plates are used for this purpose the lugs and pivot-bolt will be at the rear faces of the trees, and should the pivot-bolt break the singletree will be held in place by the tongue-and-groove joint of the plates, as will readily be understood.

Having thus fully described our invention, we claim as new and desire to secure by Letters Patent—

1. The combination, in front running-gear for vehicles, of an axle, A, a sand-board, B, fixed thereto, a head-block, C, above the sand-board, plates G H, fixed, respectively, to the parts B C and provided, respectively, with a segmental tongue, I, and corresponding groove, J, and provided also with forward lugs, L M, said parts A B formed to provide an opening, d, between their opposing faces, hounds F entering said opening and fixed to the parts A B, a reach, D, extending into the opening, and a king-bolt, E, passed through the lugs M L and the reach, substantially as shown and described.

2. The combination, in front running-gear for vehicles, of an axle, A, provided with a front lug, K, a sand-board, B, fixed thereto, a head-block, C, above the sand-board, plates G H, fixed, respectively, to the parts B C, and provided, respectively, with a segmental tongue, I, and corresponding groove, J, and provided also with forward lugs, L M, said parts A B formed to provide an opening, d, between their opposing faces, hounds F entering said opening and fixed to the parts A B, a reach, D, extending into the opening, and a king-bolt, E, passed through the lugs M L, the reach D, and the lug K, all arranged for operation, substantially as described, for the purposes set forth.

HENRY WARMINGTON.
    BENJAMIN BULGER.

Witnesses:
 GEORGE GOHN,
 THOMAS DUNCAN.